(12) United States Patent
Colom Ikuno et al.

(10) Patent No.: US 11,546,824 B2
(45) Date of Patent: Jan. 3, 2023

(54) DISTRIBUTED UPF IMPLEMENTATION FOR 5G NETWORKS

(71) Applicant: Deutsche Telekom AG, Bonn (DE)

(72) Inventors: Josep Colom Ikuno, Korneuburg (AT); Manuel Paul, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 84 days.

(21) Appl. No.: 17/089,753

(22) Filed: Nov. 5, 2020

(65) Prior Publication Data

US 2021/0144613 A1    May 13, 2021

(30) Foreign Application Priority Data

Nov. 8, 2019   (EP) .................................. 19 20 7870

(51) Int. Cl.
*H04W 40/02* (2009.01)
*H04W 76/12* (2018.01)
(Continued)

(52) U.S. Cl.
CPC ............. *H04W 40/02* (2013.01); *H04L 45/34* (2013.01); *H04L 49/3009* (2013.01);
(Continued)

(58) Field of Classification Search
CPC ... H04W 40/02; H04W 76/12; H04W 84/042; H04L 45/34; H04L 49/3009;
(Continued)

(56) References Cited

U.S. PATENT DOCUMENTS

2020/0053828 A1*  2/2020  Bharatia ............. H04W 68/005
2020/0092923 A1*  3/2020  Abraham ............. H04W 76/40
(Continued)

FOREIGN PATENT DOCUMENTS

EP    3554053 A1   10/2019

OTHER PUBLICATIONS

Bogineni Verizon A Akhavain Huawei Canada Research Centre T Herbert Quantonium D Farinacci Lispers Net A Rodriguez-Natal G Carofig: "Optimized Mobile User User Plane Solutions for 5G; draft-bogineni-dmm-optimized-mobile-user-plane.01.txt", Internet Society (ISOC) 4, No. 1, Jun. 29, 2018 (Jun. 29, 2018), pp. 1-65, XP015127176.

(Continued)

*Primary Examiner* — Kibrom T Hailu
(74) *Attorney, Agent, or Firm* — Leydig, Voit & Mayer, Ltd.

(57) ABSTRACT

A communication system for transmitting data packets includes: at least one Access Node (AN) connectable to a user equipment (UE); a User Plane Function (UPF) component; and a data network (DN). The UPF component is a distributed component and comprises: at least one User Plane Function Edge (UPF-E) component and a User Plane Function Core (UPF-C) component, the UPF-E component being connected between the at least one AN and the UPF-C component, and the UPF-C component being connected between the UPF-E component and the data network (DN) or another UPF-C; and a UPF Management (UPF-M) component configured to terminate an N4 interface.

20 Claims, 11 Drawing Sheets

(51) Int. Cl.
  *H04L 45/00* (2022.01)
  *H04L 49/00* (2022.01)
  *H04L 67/288* (2022.01)
  *H04L 67/2895* (2022.01)
  *H04W 84/04* (2009.01)

(52) U.S. Cl.
  CPC ........ *H04L 67/288* (2013.01); *H04L 67/2895* (2013.01); *H04W 76/12* (2018.02); *H04W 84/042* (2013.01)

(58) Field of Classification Search
  CPC ............... H04L 67/288; H04L 67/2895; H04L 41/0893; H04L 41/5054
  See application file for complete search history.

(56) References Cited

U.S. PATENT DOCUMENTS

2020/0128469 A1* 4/2020 Akhavain Mohammadi ............... H04L 45/64
2020/0404718 A1* 12/2020 Shekhar ................ H04W 76/12

OTHER PUBLICATIONS

"3$^{rd}$ Generation Partnership Project; Technical Specification Group Services and System Aspects; System Architecture for the 5G System (5GS); Stage 2 (Release 15)", 3GPP Draft; 23501-F70, Sep. 24, 2019 (Sep. 24, 2019), XP051799863.

* cited by examiner

DISTRIBUTED UPF IMPLEMENTATION FOR 5G NETWORKS

CROSS-REFERENCE TO PRIOR APPLICATIONS

Priority is claimed to European Patent Application No. EP 19 20 7870.7, filed on Nov. 8, 2019, the entire disclosure of which is hereby incorporated by reference herein.

FIELD

The invention relates to a distributed User Plane Function (UPF) implementation for 5G networks being backwards-compatible with 3GPP-specified user plane (UP) transmission using General Packet Radio Service (GPRS) Tunneling Protocol for the user plane (GTP-U). This invention covers the distributed UPF implementation as well as the registration of the UPF in the 5G network in a transport-network-agnostic way from the point of view of the interfaces the UPF exposes to other 5G network components.

BACKGROUND

Current networks are shifting to very high bandwidths rapidly. It is important for operators to achieve high capacity at low cost. One of the options is to use commercial off-the-shelf (COTS) network equipment which can be reprogrammed for specific telecommunication needs.

However, this option is impeded by the complex protocol stacks used in the telecommunication domain. The UPF is capable of performing very complex traffic processing by chaining packet processing rules, but the protocol stack standardized by 3GPP is based on GTP-U for packet transport, a protocol already used in Global System for Mobile Communications (GSM) networks.

COTS-based network equipment are typically based on merchant silicon (a term used to describe chips which are designed and made by an entity other than the company providing a particular service in which they are used) optimized for Ethernet and/or IPv4/IPv6 packet processing and are capable of performing data processing of traffic at high capacity and low cost per traffic unit. Such merchant silicon is, however, not capable of processing the specific protocol stacks used in telecommunication.

FIG. 1 shows the 5G system architecture as standardized by 3GPP. A User Equipment (UE), e.g. a mobile phone or other device, is connected to an Access Network (AN). The AN is connected to a Core Network (CN), which allows the UE to have connectivity to a Data Network (DN), e.g. an external data network, such as the Internet. Several Control Plane (CP) and UP interfaces are specified for the UPF. These are the N3 interface (AN-UPF UP), the N4 interface (a Session Management Function, SMF-UPF CP), the N6 interface (UPF-DN UP), and the N9 interface (UPF-UPF UP, e.g. for UPF chaining).

The UPF distributed implementation according to the invention focuses on the N3, N4 and N6 interfaces of the UPF and how the UPF functionality is distributed over different entities, that is UPF components, while keeping backwards-compatibility with current 3GPP systems.

FIG. 2 shows the UP protocol stack as specified by 3GPP. In order to transmit data, a UE uses a PDU session over which the application traffic is sent. The data of the PDU session is encapsulated in GTP-U packets.

The CN is, as specified by 3GPP, transport-agnostic, i.e. it need not be aware of the underlying protocol stacks employed to transport its traffic. As an example, if a Segment Routing version 6 (SRv6)-based transport network is used to transport the UP traffic between AN and CN, as seen in FIG. 3, the SRv6 protocol stack provides just transport capabilities. This overall protocol stack including a SRv6 transport network is shown in FIG. 4.

SUMMARY

In an embodiment, the present invention provides a communication system for transmitting data packets, the system comprising: at least one Access Node (AN) connectable to a user equipment (UE); a User Plane Function (UPF) component; and a data network (DN); wherein the UPF component is a distributed component and comprises: at least one User Plane Function Edge (UPF-E) component and a User Plane Function Core (UPF-C) component, the UPF-E component being connected between the at least one AN and the UPF-C component, and the UPF-C component being connected between the UPF-E component and the data network (DN) or another UPF-C; and a UPF Management (UPF-M) component configured to terminate an N4 interface.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
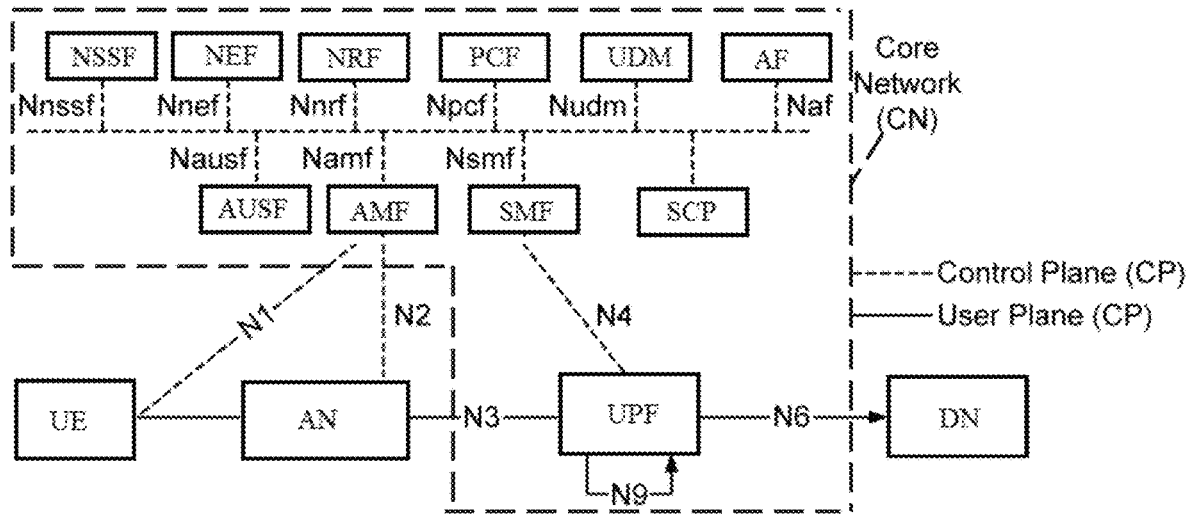
FIG. 1 illustrates an exemplary 5G system architecture of the Control Plane and the User Plane as defined by the 3GPP TS 23.501.

Exemplary embodiments of the present invention provide a distributed UPF implementation which is backwards-compatible with 3GPP-specified GTP-U transport for UP.

According to the distributed UPF implementation of the present invention, an operator may achieve a cloudification, which means deploying software that has been architected and specifically designed for cloud environments, of the user plane including: easier transport due to the use of network protocols that allow the use of multiple headers or labels without the need of using GTP-U tunneling over the network within the distributed UPF, distributed deployment of UPF functionality, backwards compatibility with current 3GPP specifications and improved flexibility for handling different QoS flows. As the UPF functionality can be distributed over different platforms such as, for example, COTS white-box hardware packet processors (e.g. P4-capable) and Linux machines, different packet processing steps can be performed in the most suitable platforms. For example, simple, high-throughput packet forwarding can be performed on hardware-assisted nodes and computationally-intensive deep packet inspection can be performed in COTS servers on CPU processing.

The heterogeneity of the tasks to be performed on the data traffic makes it challenging to use a homogeneous cloud to process such traffic, that is a cloud composed of nodes with equal capabilities. An operator may have different types of traffic with different needs. For example, high-bandwidth Internet traffic (e.g. Tb/s) requiring little processing could be easily processed by white-boxes with commodity data processing silicon with a limited feature set. Mobile traffic typically requires a multitude of traffic rules, buffering rules and Quality of Service (QoS) rules. In such a case, this may require COTS servers capable of more complex processing, with a higher per Gb/s cost.

This UPF distributed implementation allows for distributed packet processing and native transport of 5G UP over a network, employing network protocols that allow the use of multiple headers or labels to achieve such distributed packet processing, such as, for example, Segment Routing version 6 (SRv6) or Multiprotocol Label Switching (MPLS), without the need of using GTP-U tunneling over the network. Thus allowing UPF components and transport network routers to use the same protocol stack.

For explanation and illustration purposes, the following description focuses on the applicability of SRv6 and uses the nomenclature thereof to describe how the packet processing is distributed among UPF components. Such network protocols are referred to as programmable network protocols, because the packet headers are used to encode the UPF data processing required by each component, that is, to program the data processing.

In view of the above, the present invention provides a distributed UPF implementation exemplarily using SRv6 as a network protocol for natively transporting UP traffic, thereby making it easier for operators to implement UP processing using COTS and to integrate UPF functionality within SRv6-capable nodes in the transport network. This architecture can also be applied to other CN nodes, such as the Wireline Access Gateway Function (WAGF) or 4G nodes such as the Serving Gateway (SGW) and Packet Data Network Gateway (PGW).

In the described architecture, an operator may then optimally deploy the functionality required by a data flow.

As the core network is, as specified by 3GPP, transport-agnostic, it is not possible to expose specifics of the employed programmable network protocol via means standardized by 3GPP. The present invention also details how the described distributed UPF can be registered into the 5G network. As the UPF internals are not exposed to the 5G network, the described method is also applicable to distributed UPF implementations not using internally a programmable network protocol such as SRv6 or MPLS.

According to a first aspect, the invention provides a communication system adapted to transmit data packets, the system comprising: at least one Access Node (AN), connectable to a user equipment (UE); a User Plane Function (UPF) component; and a data network (DN). The UPF component is a distributed component and comprises: at least one User Plane Function Edge (UPF-E) component, and a User Plane Function Core (UPF-C) component, the UPF-E component being connected between the AN and the UPF-C, and the UPF-C being connected between the UPF-E and the data network (DN), or another UPF-C; a UPF Management (UPF-M) component configured to terminate an N4 interface.

According to a second aspect, the invention provides a communication system adapted to transmit data packets, the system comprising: at least one Access Node (AN), connectable to a user equipment (UE); a User Plane Function (UPF) component; and a data network (DN); and a transport network (TN). The UPF component is a distributed component and comprises: at least one User Plane Function Edge (UPF-E) component, and a User Plane Function Core (UPF-C) component, the UPF-E component being connected between the AN and the transport network, and the UPF-C being connected between the transport network (TN) and the data network (DN) or another UPF-C; a UPF Management (UPF-M) component configured to terminate an N4 interface.

The transport network (TN) may be a Segment Routing version 6 (SRv6) TN or a Multiprotocol Label Switching (MPLS) TN.

In these aspects, the UPF-M may be further configured to: control which packet processing capabilities are required at the UPF-E and the UPF-C components, wherein the packet processing comprises at least one Packet Detection Rule (PDR) and at least one packet processing rule, wherein a PDR indicates at least one packet processing rule; receive packet processing information from a Session Management Function (SMF) via the N4 interface, wherein the packet processing information contains information indicating which type of packet processing is required by the at least one PDR; decide, for each data packet, a route containing which UPF-E and UPF-C components each data packet has to traverse; signal the PDR to the chosen first UPF-E or UPF-C component in the route.

In these aspects, if one or more UPF components of the route lacks one or more required packet processing capabilities, the UPF-M may be configured to distribute the one or more required packet processing capabilities to each one or more UPF components.

In these aspects, the communication system may comprise a plurality of Access Nodes (ANs) and a plurality of UPF-E components, wherein each UPF-E component is connected to at least one AN.

In these aspects, the communication system may further comprise another UPF-C component being connected between the UPF-E component and the TN, or between the UPF-E component and the DN or between two or more UPF-C components.

In these aspects, each UPF-E component may be configured to expose towards the AN or ANs that it connects, a same IP-Protocol Data Unit Session Anchor (IP-PSA).

In these aspects, the first UPF-E or UPF-C component of the route may be configured to: receive the packet processing information from the UPF-M; execute a PDR on a data packet; insert one or more Segment Routing Headers (SRHs) in the data packet, wherein the SRHs indicate to the next node of the route what data processing rules are to be executed on the data packet, and wherein the SRHs contain a locator and a function, where the locator is used to route the packet to the node and the function identifies the action to be performed on the next node; apply the corresponding packet processing rules for this first UPF-E or UPF-C component to packets matching the PDR; and forward the data packet to the next component of the route.

In these aspects, the next component of the route may be configured to: receive the packet processing information from the UPF-M; apply the corresponding packet processing rules for this next UPF-E or UPF-C component according to information present in the locators and functions; and forward the data packet to the next component of the route or the DN, according to the information present in the SRHs.

In these aspects, each UPF-E may be configured to: receive a data packet from the connected AN; terminate a General Packet Radio Service (GPRS) Tunneling Protocol for the user plane (GTP-U) tunnel with the connected AN or ANs; map, according to the packet processing information as provided by the UPF-M, the GTP-U tunnel information to the one or more SRH; and forward the data packet to the UPF-C component.

In these aspects, the UPF-C component may be configured to: receive a data packet from the DN; map, according to the packet processing information as provided by the UPF-M, the data packet to a mapped IPv6 address of a GTP-U tunnel; and forward the data packet to the UPF-E or UPF-C component.

In these aspects, the UPF-E component may be configured to register a Network Function Repository Function (NRF) Network Function Service (NFS) instance exposing one or more N3 interfaces, its location or a combination thereof; and/or the UPF-C component may be configured to register a Network Function Repository Function (NRF) Network Function Service (NFS) instance exposing one or more N6 interfaces, its location, its supported Data Network Names (DNNs) or a combination thereof; and/or the UPF-M component may be configured to register a Network Function Repository Function (NRF) Network Function Service (NFS) instance exposing one or more N4 interfaces, its location or a combination thereof.

In these aspects, the UPF-C or UPF-E components may be co-located, wherein co-located components may run on a same device or software package, as a next generation Node B-Central Unit (gNB-CU) or TN component.

Other aspects, features, and advantages will be apparent from the summary above, as well as from the description that follows, including the figures and the claims.

The present invention assumes that the Access Network (AN) and the 5G core of the network are connected via a transport network (TN).

Figure 3:
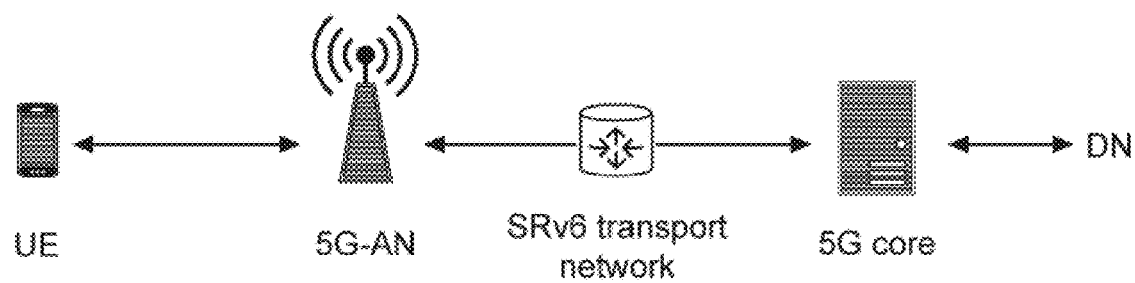
FIG. 3 illustrates a 5G network using SRv6 transport between AN and 5G core for UP.
Figure 4:
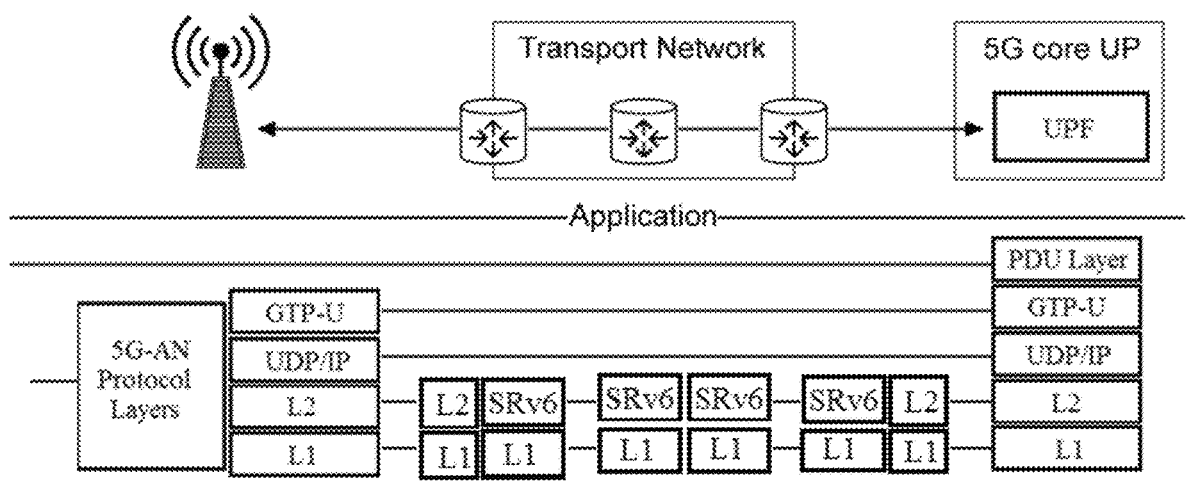
FIG. 4 illustrates an example of a 5G User Plane Protocol Stack with a SRv6 transport network according to the prior art.

As shown in FIG. 3, SRv6 is used as transport network between the 5G core and the AN. FIG. 3 shows a User Equipment (UE) that communicates, through the AN and the 5G core, with a Data Network (DN) (e.g. an External Network such as the Internet).

According to a preferred embodiment of the present invention, the UPF is split into one or more Edge components (UPF-E) and one or more Core components (UPF-C), in the User Plane (UP), and a Management UPF (UPF-M), which will be described later, in the Control Plane (CP). From a functional perspective, it is still a single UPF (as is the case shown in FIG. 1), as specified by 3GPP and using the 3GPP-specified protocol stack (as shown in FIG. 2), but implemented and deployed in a distributed architecture.

Figure 5:
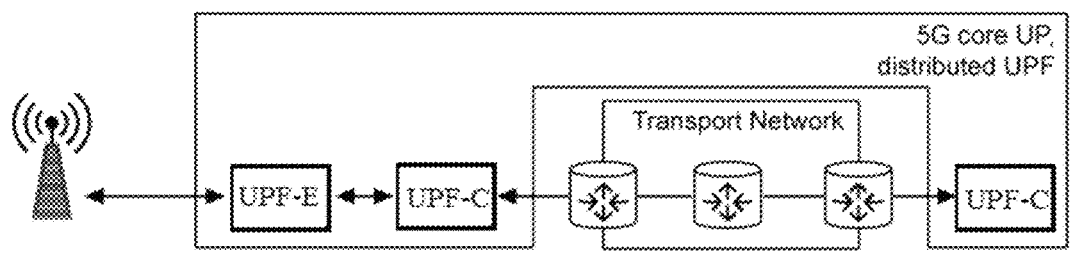
FIG. 5 illustrates an example of the 5G User Plane Protocol Stack and architecture with distributed UPF implementation according to an embodiment of the present invention.
Figure 5:
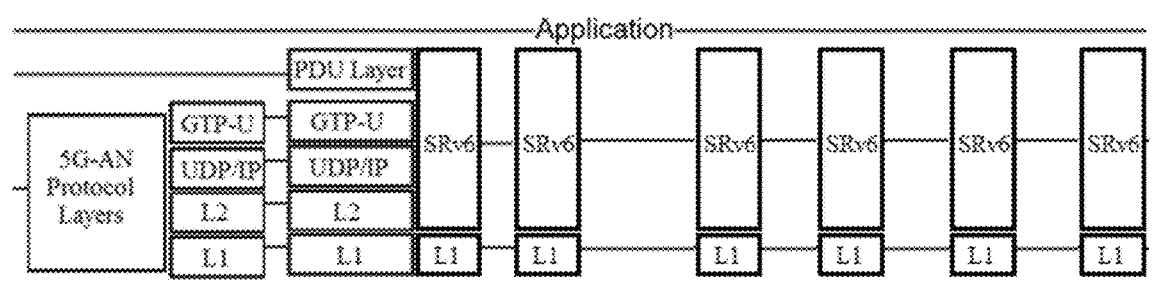

FIG. 5 illustrates an example of the 5G User Plane Protocol Stack and architecture with distributed UPF implementation according to an embodiment of the present invention. FIG. 5 shows a UPF-E and a UPF-C deployed between the AN and the transport network, while at least one UPF-C is deployed between the transport network and the external network (note that FIG. 5 shows the architecture of the User Plane, so that UPF-M, which is part of the Control Plane, is not shown).

As illustrated in FIG. 5, functionally the UPF, as a functional entity, now stretches on both sides of the transport network (i.e. is a distributed UPF). Further, as shown in FIG. 5, the GPRS Tunneling Protocol for the user plane (GTP-U) is terminated at the UPF-E and thus before entering the transport network. The protocol stack used by UPF-C and transport network is common, in both cases based on SRv6, as an exemplary network.

Figure 6:
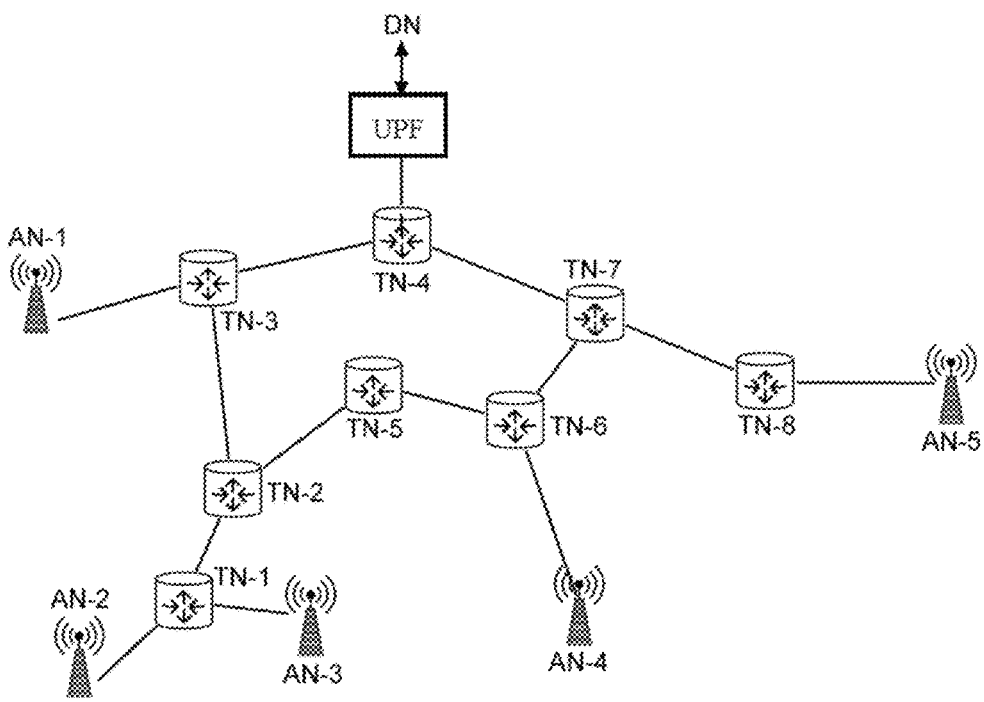
FIG. 6 illustrates an example of a deployment using a conventional UPF implementation.
Figure 7:
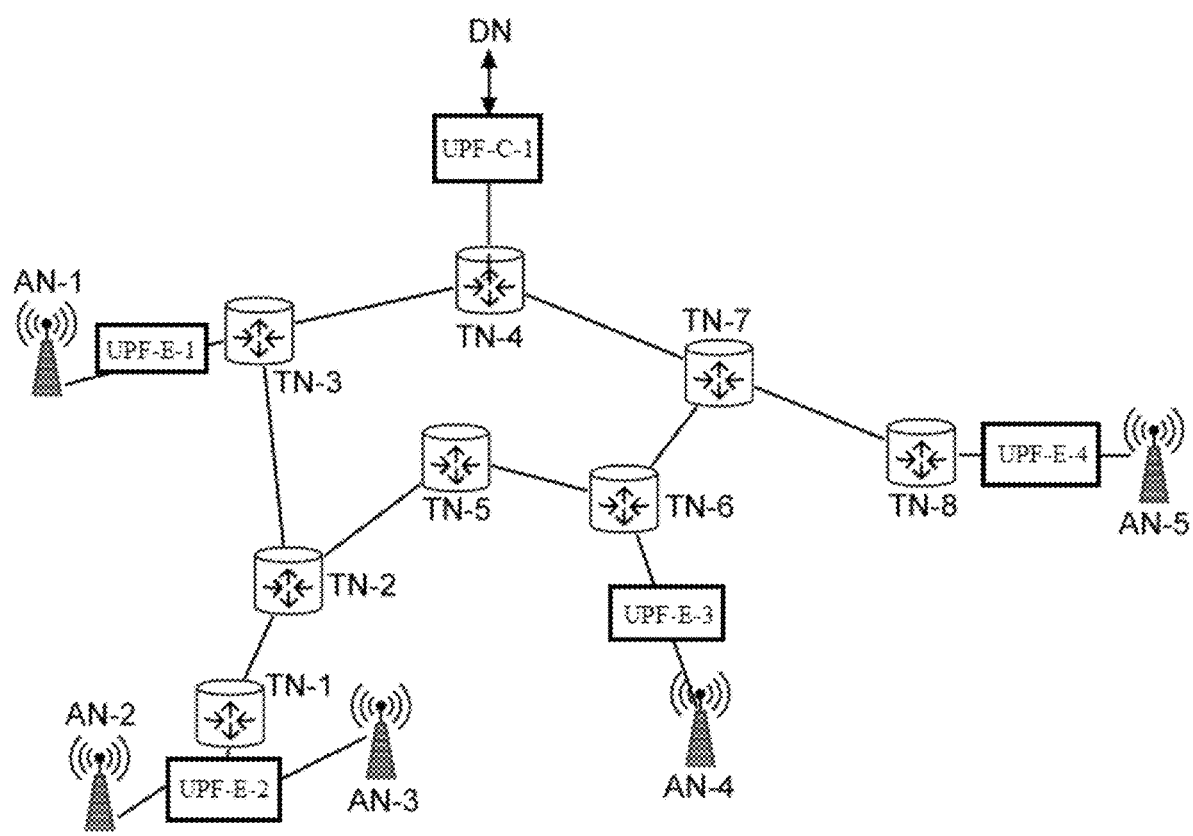
FIG. 7 illustrates an example of a deployment using a distributed UPF implementation according to an embodiment of the present invention.

In terms of deployed components over a network, FIG. 6 shows a UPF placed after the transport network according to the prior art, while FIG. 7 illustrates a deployment of the same system, using distributed UPF implementation according to an embodiment of the present invention. The fact that the UPF-C and TN use the same protocol stack, as depicted in FIG. 5, enables that the UPF-C and the TN can run on the same networking hardware (e.g. merchant silicon-based networking equipment) or platform (e.g. Linux-based SRv6 protocol implementation).

Referring to FIG. 6, the Access Nodes AN-1 to AN-5 are connected, via the transport network, which is composed of TN-1 to TN-8, to the UPF, wherein the UPF is implemented in a conventional manner. The UPF is connected to the DN.

Referring again to FIG. 7, from the UP perspective, two aspects are considered by the invention which differ from the implementation as shown in FIG. 6: 1) the UPF-E functionality may be co-located with the AN or TN functionality (e.g. a Mobile Edge Computing (MEC) unit hosting AN functionality and UPF-E functionality); and 2) the UPF-C functionality may be co-located with the transport network functionality (e.g. a SRv6-capable COTS device supporting processing SRv6 headers for UPF functionality as well as SRv6 headers for transport network functionality).

With regard to mobility of UEs within and between Radio Access Technologies (RATs), the current 3GPP standards define a Protocol Data Unit (PDU) Session Anchor (PSA), which is the termination point of a PDU session. The protocol stack for the PDU layer is terminated at the PSA. The PSA corresponds to the UPF as depicted in FIG. 3.

Figure 8:
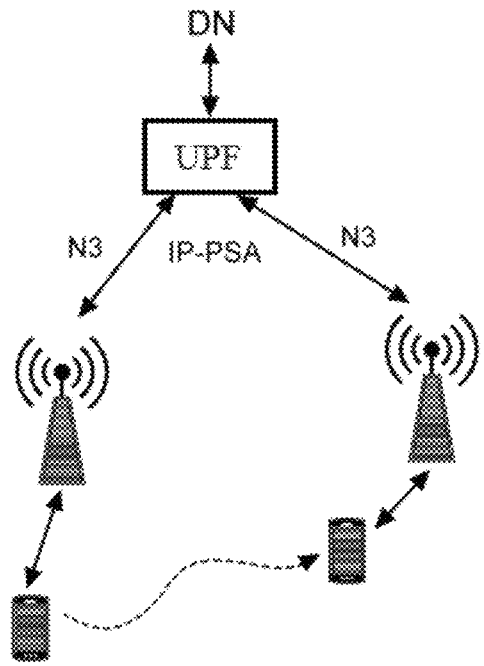
FIG. 8 illustrates an example of mobility and a Protocol Data Unit (PDU) Session Anchor (PSA) using conventional UPF implementation.

In the above case of mobility, maintaining the PSA requires that the AN IP endpoint of the UPF and the AN nodes are attached via N3 interfaces so that the GTP-U tunnel endpoints remain unchanged. This is illustrated in FIG. 8, which shows an example of mobility and Protocol Data Unit (PDU) Session Anchor (PSA) using traditional UPF implementation, where the IP endpoint for the N3 interfaces towards the AN nodes is depicted as IP-PSA. The IP-PSA endpoint address is communicated between AN nodes and UE traffic remains anchored there before and after the mobility procedure.

Figure 9:
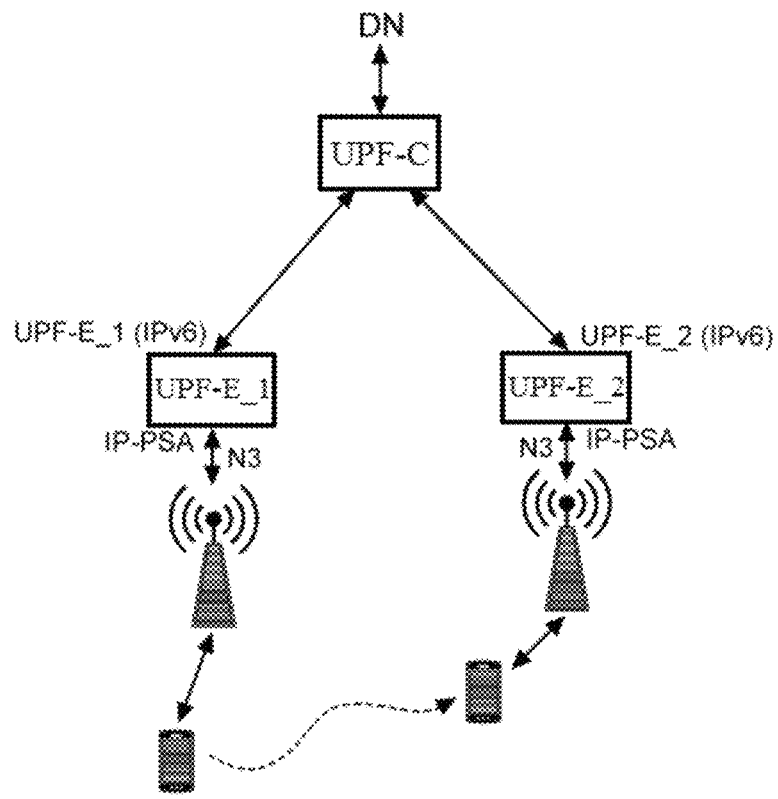
FIG. 9 illustrates an example of mobility and a PDU Session Anchor (PSA) using distributed UPF implementation according to the present invention.
Figure 10:
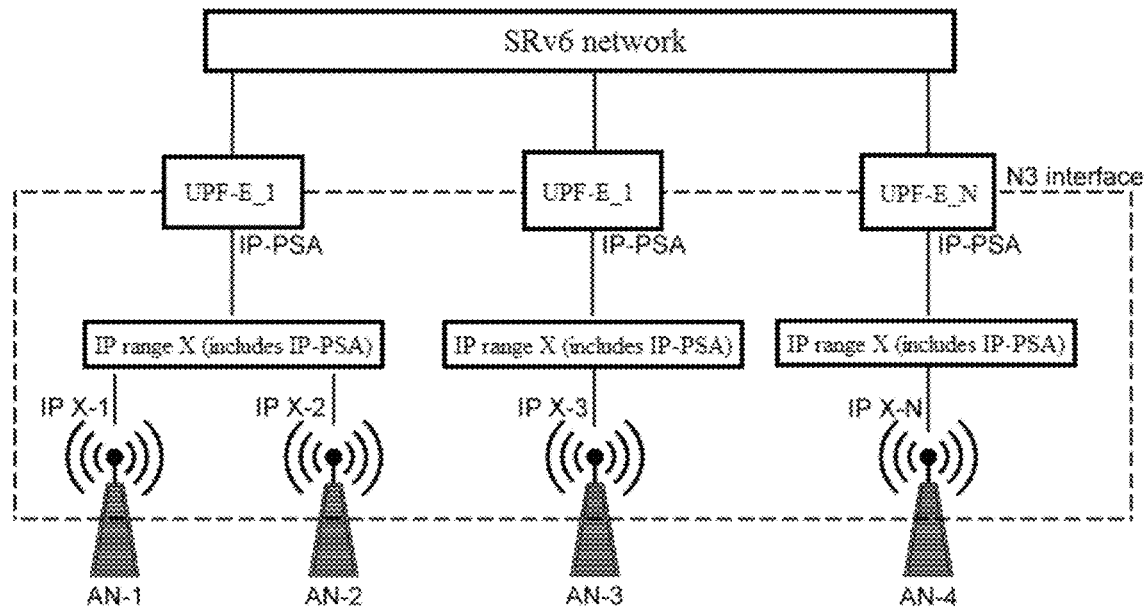
FIG. 10 illustrates an example of the N3 interface addressing for UPF-E.

According to a preferred embodiment of the invention and referring to FIG. 9, in order to appear as a single UPF, each UPF-E exposes, towards the AN or ANs it connects, the same IP address (IP-PSA). As shown in FIG. 10, separate, isolated networks for the IP subnet of IP-PSA are used to provide connectivity between UPF-E and AN nodes. Thus, support of mobility, using distributed UPF implementation is ensured.

Mobility is thus supported without the need of anchor reallocation, as seen from AN perspective. Existing methods can be employed to ensure the traffic reaches the appropriate UPF-E in case of mobility. This may include a reconfiguration of the packet route and/or packet forwarding by the UPF-M (which will be described later). From UE and AN perspective, there is a PSA endpoint, that is IP-PSA and the fact that there are one or several UPF-E exposing the same IP-PSA is not visible Analogously to how a UPF maps incoming packets to a given N3 interface (as described before with reference to FIGS. 8 and 9, i.e. GTP-U tunnel, IP address), the mapping between the PDU session and the destination UPF-E is done as follows.

The UPF-C, which receives the packets from the external network, maps the incoming packet to the mapped IPv6 address of the GTP-U tunnel. With this address, incoming packets can be routed to the corresponding UPF-E. The same principle applies for the outgoing (i.e. originating from the User Equipment (UE)) traffic.

Next, the packet forwarding model, used by the distributed UPF implementation of the present invention, is explained as follows.

Figure 11:
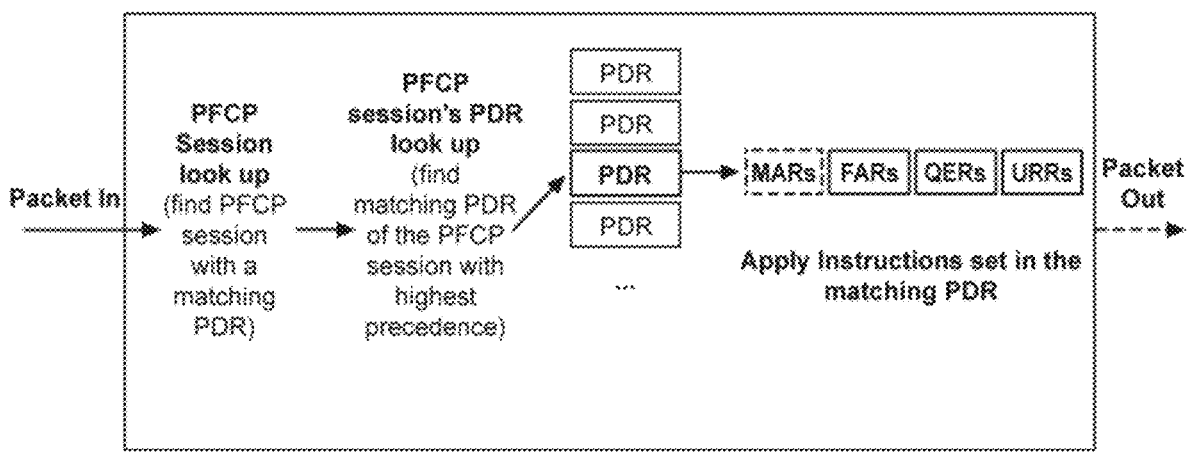
FIG. 11 illustrates the User Plane (UP) packet processing flow in the UPF as defined by the 3GPP TS 29.244.

The packet processing flow in the UP, compliant with 3GPP TS 29.255, is shown in FIG. 11 and includes Packet Detection Rule(s) (PDRs) and a number of packet processing rules. Among the packet processing rules: Forward Action Rule (FAR), QoS Enforcement Rule (QER), Usage Reporting Rule (URR), Buffering Action Rule (BAR).

According to an embodiment of the invention, the distributed UPF implementation allows packet processing to be distributed over the UPF-E and UPF-C nodes. This is possible thanks to the introduction of a third entity named UPF-M, which controls what packet processing functionality is deployed in each component.

Figure 2:
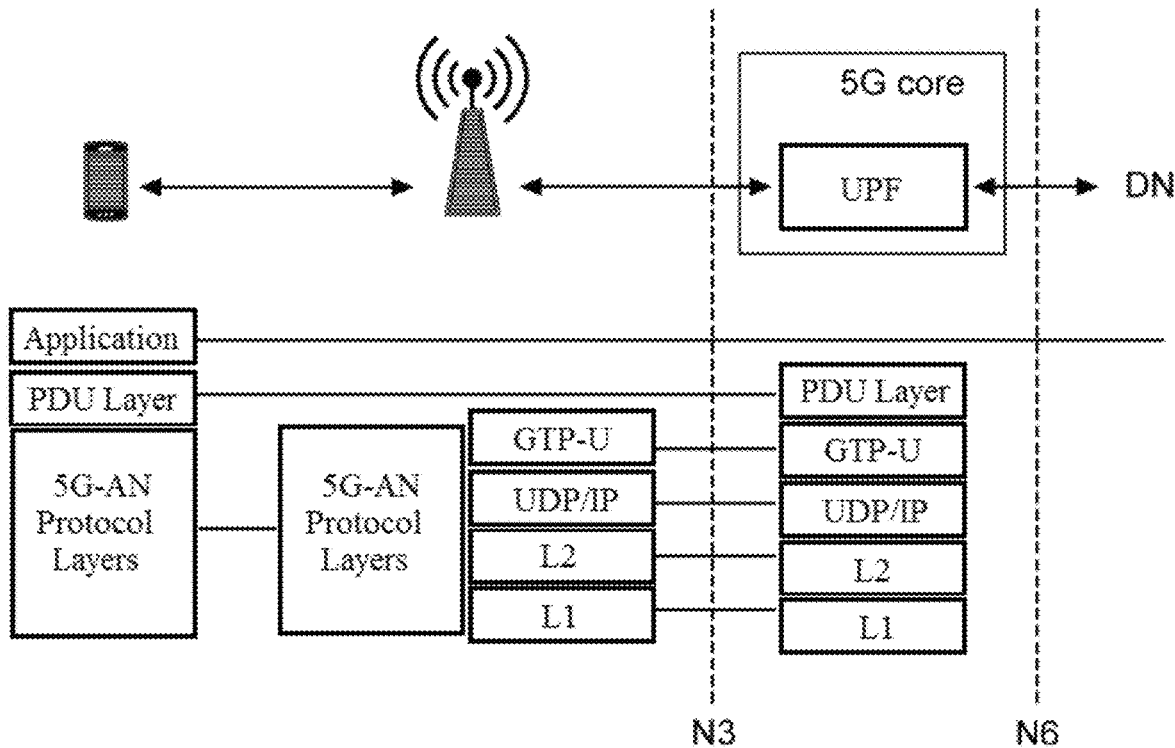
FIG. 2 illustrates the User Plane Protocol Stack as defined by the 3GPP TS 23.501.
Figure 12:
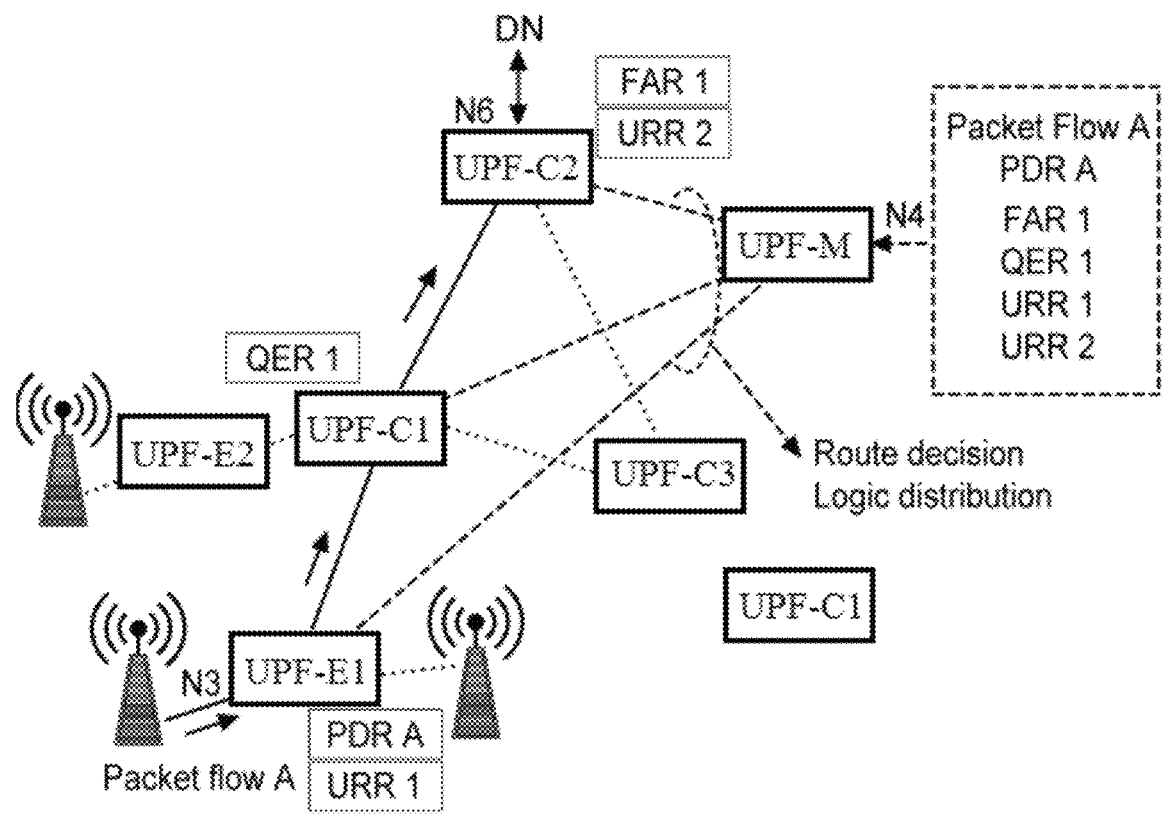
FIG. 12 illustrates an example of the route decision and logic distribution using a distributed UPF implementation according to the present invention.

Referring to FIG. 12, the UPF-M exposes a standards-compliant N4 CP interface towards the other components in the network, typically the Session Management Function, SMF, component as shown in FIG. 1. The UPF-M controls the UPF-E and the UPF-C nodes. The UPF-M shown in FIG. 12 performs the following functionality:

Receive via the N4 interface the actions to perform on a given data flow.

Decide, for each data flow it is requested to provide and for each direction of the data flow, that is the AN-DN direction and DN-AN direction, the route the data flow takes. i.e. which UPF-E and UPF-C components it traverses.

Signal the Packet Detection Rule (PDR) to the first UPF component in the route(s).

Distribute the data processing logic (FARs, QERs, URRs, BARs, . . . ) over the components in the route(s) if necessary. For example, if UPF-C2 does not have the logic or capabilities required to execute URR2, UPF-M deploys the necessary logic in UPF-C2.

Signal the data processing logic (FARs, QERs, URRs, BARs, . . . ) over the UPF components in the route(s).

Figure 13:
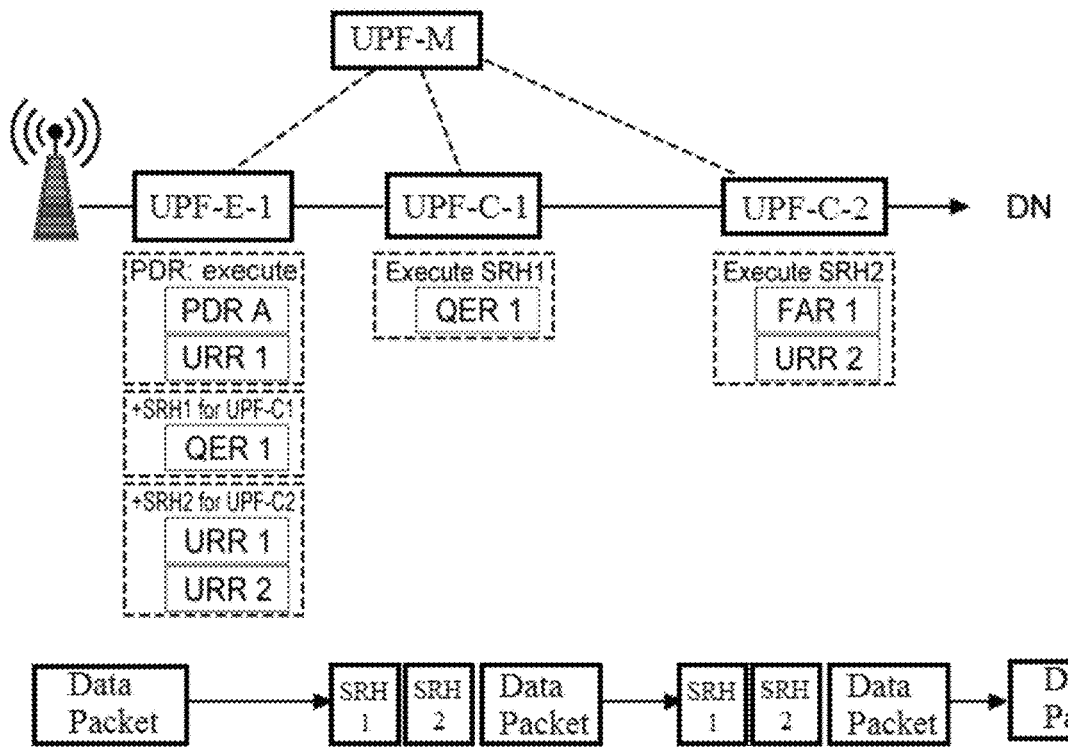
FIG. 13 illustrates the functional split for outgoing packets using distributed UPF implementation according to the present invention.

In connection with the above, FIG. 13 illustrates the functional split for outgoing packets for the example N4 request illustrated in FIG. 12. For packets originating from the DN (incoming packets), PDR execution and header inserting is performed first in UPF-C. In other words, the step is performed within entry of the data flow into the UPF.

As shown in FIG. 13, a PDR is executed at the first element of the route (in the case of FIG. 13 by UPF-E-1). One or more Segment Routing Headers (SRHs) are appended to the data packet. The SRHs indicate to the next elements what data processing rules are to be executed on the packet flow. In the current example of FIG. 13, SRH1 is added for UPF-C-1, which is the next element, and SRH2 is added for UPF-C-2, which is the element that follows after UPF-C-2. SRHs contain a locator and a function, where the locator is used to route the packet to the node and a function, which identifies the action to be performed on the node.

The knowledge of the mapping between SRH content and the actions it triggers is local knowledge on the node and is configured by the UPF-M. In the example shown in FIG. 13, UPF-C-2 knows that the information contained in SRH2 maps to performing FAR1 and URR2 on the packet flow. The mapping between SRH content and the processing performed by each node (UPF-E or UPF-C) is controlled by UPF-M.

The next elements are tasked with executing the data processing for the data packet(s). The UPF-M has already ensured that the necessary logic is deployed on each element.

For example, as shown in FIG. 13, UPF-C-1 is required to execute QER1 for data flow A, but UPF-M is aware that the software module required for UPF-C-1 to execute this task is not installed in UPF-C-1. Thus, UPF-M deploys the module in UPF-C-1 (FIG. 12).

Continuing with the above same example, as depicted in FIGS. 12 and 13, UPF-C-2 is required to execute FAR1 and URR2 for data flow A, but UPF-M is aware that the software module required for UPF-C-2 to execute these tasks is not installed in UPF-C2. Thus, the UPF-M deploys the module in UPF-C-2 (FIG. 12). In the case the software module would be already deployed in the node (e.g. if another packet processing flow uses it), UPF-M need not deploy the software.

The applicability of the distributed UPF implementation of the present invention can be applied to other 5G Core components employing GTP-U for UP encapsulation, such as Wireline Access Gateway Function (W-AGF), Serving Gateway (S-GW), PDN Gateway (P-GW).

Figure 14:
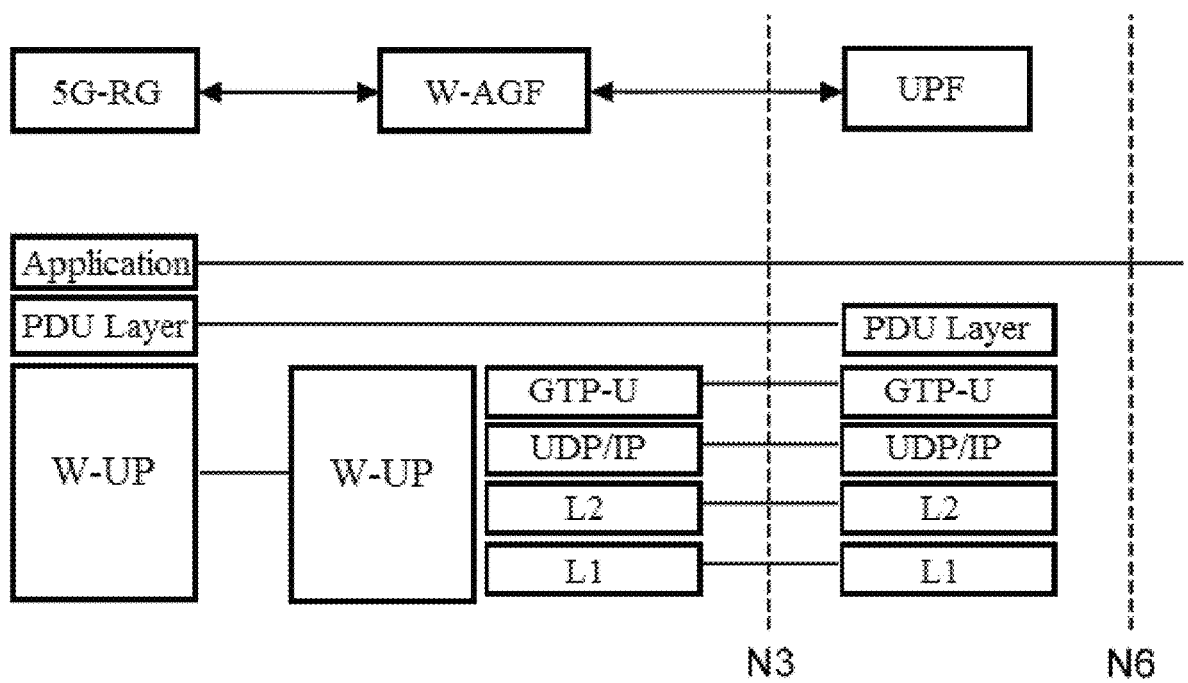
FIG. 14 illustrates the User Plane Protocol Stack for a Wireline Access Gateway Function (W-AGF) according to the prior art.
Figure 15:
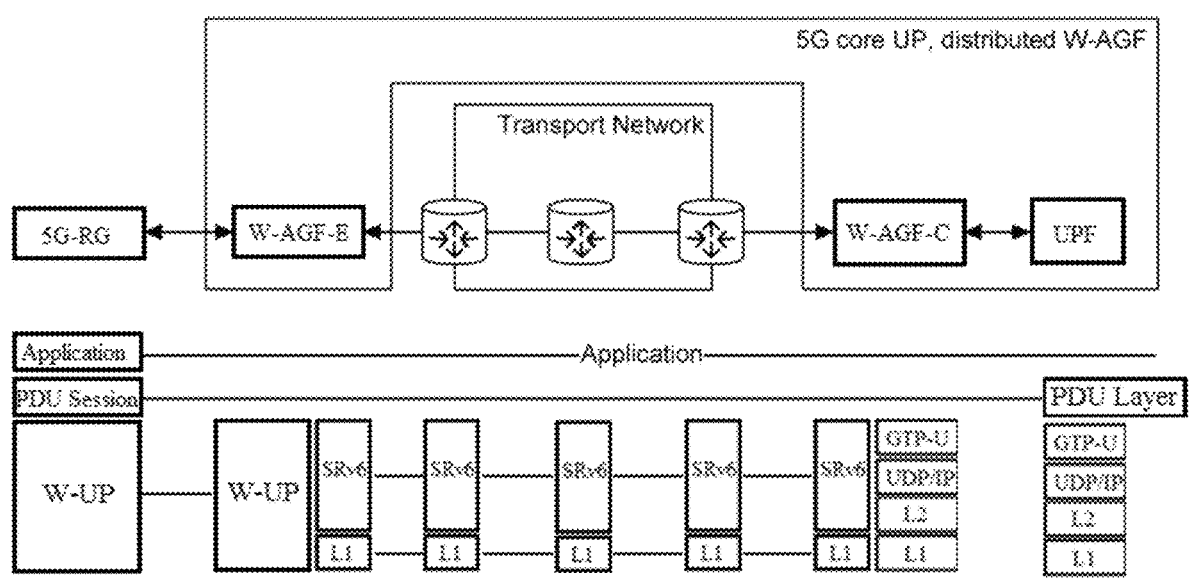
FIG. 15 illustrates an example of applicability of the distributed UPF implementation according to the present invention into a Wireline Access Gateway Function (W-AGF).

The W-AGF provides Wireline 5G Access Network connected to the 5G Core Network. The applicability of the distributed UPF implementation to W-AGF, for comparison purposes, is illustrated in FIGS. 14 and 15. FIGS. 14 and 15 illustrate the User Plane Protocol Stack for W-AGF according to the prior art and an embodiment of the present invention, respectively.

The protocol stack (UP) for the W-AGF, shown in FIG. 14 is similar to that used by the UPF, shown in FIG. 2, with the difference that the GTP-U part of the W-AGF is on the opposite side of the split.

This distributed implementation can also be applied to other network components.

FIG. 15 illustrates how a W-AGF can be split with the same principle. In this case, W-AGW functionality such as the mapping between QoS flows to Wireline UP (W-UP) (also depicted in FIG. 14) resources and AN-specific QoS marking can, based on the decisions of an W-AGW-M, be distributed over several W-AGF-E and/or W-AGW-C.

Figure 16:
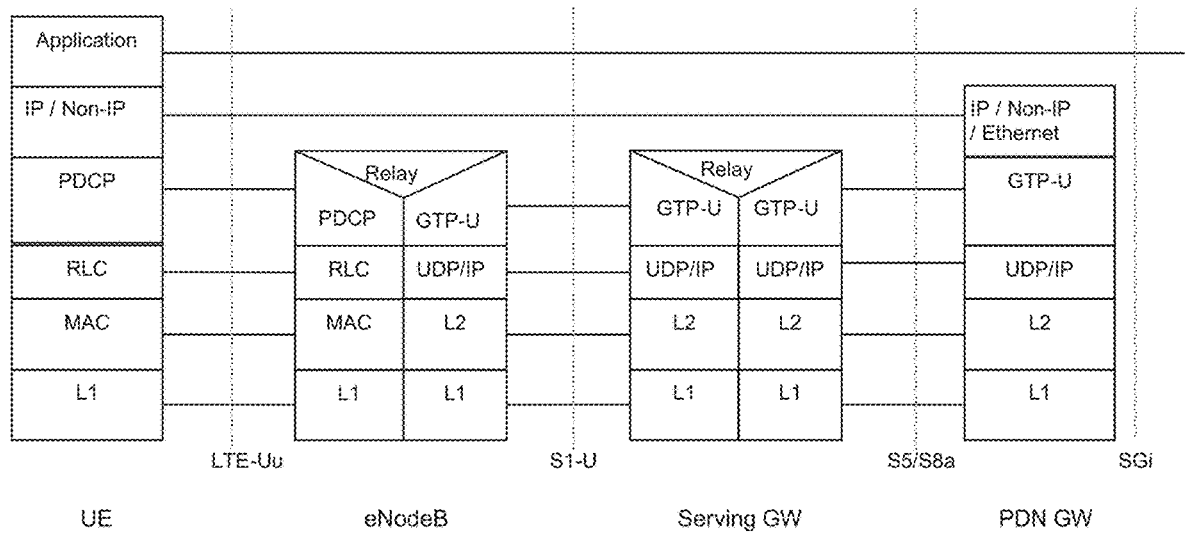
FIG. 16 illustrates an example of applicability of the distributed UPF implementation according to the present invention into a Serving Gateway (S-GW) and a Packet Data Network Gateway (PDN GW/PGW) as defined by the Evolved Packet Core (EPC) 3GPP TS 23.401.

The S-GW and P-GW provide UP functionality to the Evolved Packet Core (EPC). The protocol stack (UP) used in the EPC for a Serving Gateway (S-GW) and a Packet Data Network Gateway (PDN GW/PGW), shown in FIG. 16 is the same as in 5G (shown in FIG. 5). As such, the same distributed implementation can be applied to these EPC components: an S-GW, P-GW or for a S/P-GW combination.

The application of the distributed UPF implementation according to the invention allows achieving an effective removal of the GTP-U when deployed with distributed Radio Access Networks (RAN).

Figure 17:
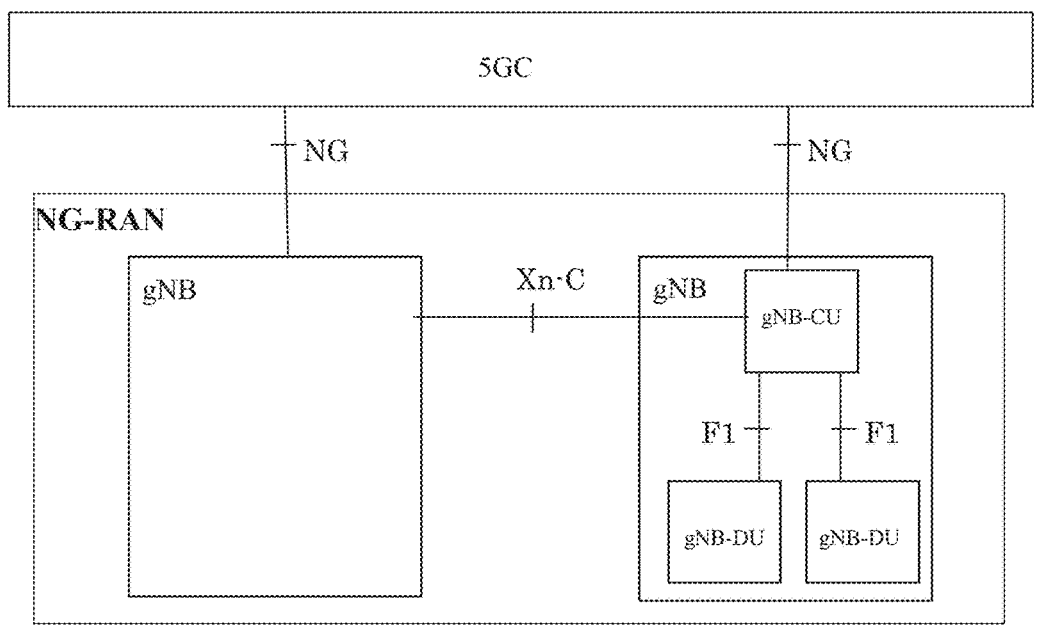
FIG. 17 illustrates the Next Generation Access Network (NG-RAN) Overall Architecture as defined by the 3GPP.

As shown in FIG. 17, 5G's Next Generation (NG) RAN allow for a distributed architecture. This means that the functionality provided by a 5G radio node (gNB) is deployed over several nodes. As shown in FIG. 17 (right), a gNB can be decomposed into one or several gNodeB Distributed Units (gNB-DUs) connected to a gNodeB Central Unit (gNB-CU). While gNB-DUs have tight real-time processing requirements and are typically implemented on specialized platforms, gNB-CUs are more easily deployable on COTS.

By co-locating a gNB-CU and UPF-E, i.e. applying the UPF split as above described, it is possible to contain the GTP-U part of the protocol stack to local communication, thereby effectively removing it from the network.

Figure 18:
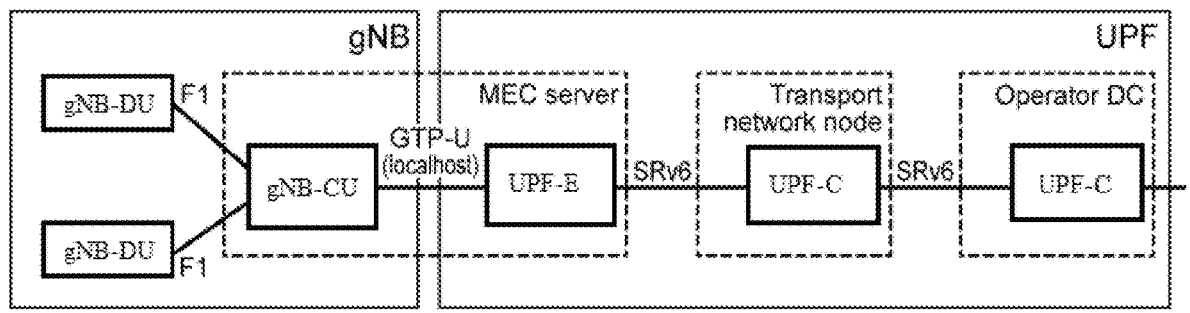
FIG. 18 illustrates an example of a distributed UPF implementation with GTP-U contained to a local device.

By way of an example, FIG. 18 illustrates a deployment in which a gNB-Central Unit (gNB-CU) and a UPF-E accomplish that the GTP-U portion of the transmission is contained in one device, in the depicted example a Mobile Edge Computing (MEC) server (i.e. local network connection, e.g. localhost-to-localhost), and effectively accomplishes the removal of GTP-U from the network while keeping the protocol stack in line with the current standards.

In order for the Session Management Function (SMF) to be able to take additional advantage of the distributed nature of the UPF, the present invention allows the UPF to register Network Function (NF) Services (NFS) exposing 3GPP-compliant interfaces into the NF Repository Function (NRF). NFs and NFSs registered in the NRF are discoverable in the 5G system.

Figure 19:
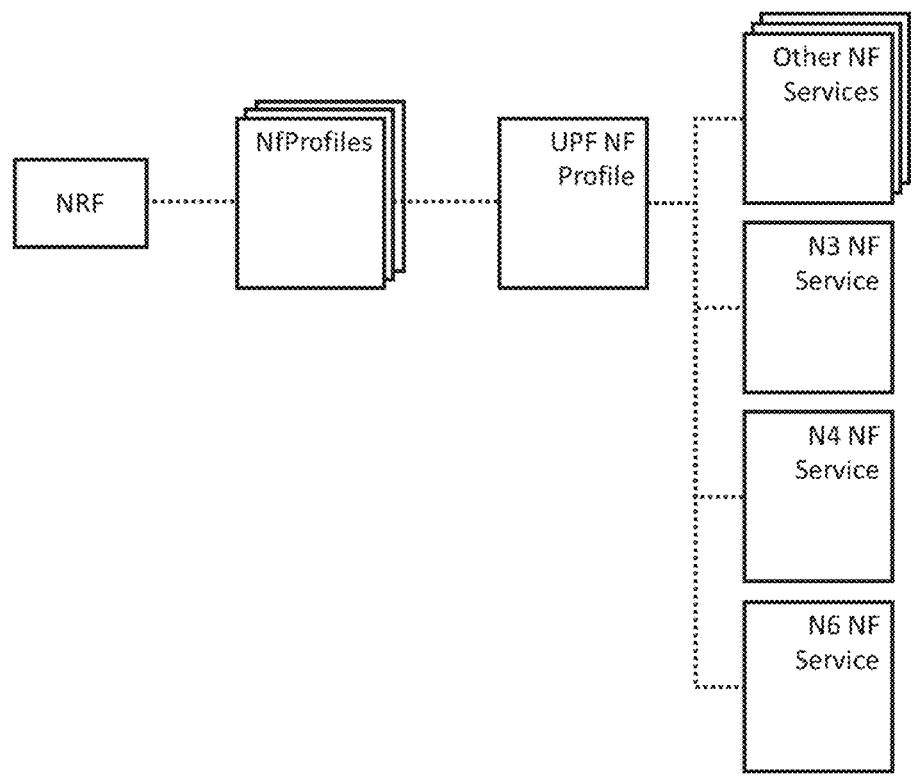
FIG. 19 illustrates the NRF registration data of UPF Network Function Services (NFSs).

This implementation registers into the NRF NFS instances of the following three types, as shown in FIG. 19:

N3 NFS: instance exposing ore or more N3 interfaces, that is a UPF-E instance. Includes the location of this instance, as well as the address or addresses of the N3 interfaces N6 NFS: instance exposing one or more N6 interface, that is a UPF-C instance. Includes the location of this instance, as well as the address or addresses of the N6 interfaces and the supported DNs, expressed as Data Network Names (DNNs)

N4 NFS: instance exposing one or more N4 interfaces, that is a UPF-M instance. Includes the location of this instance, as well as the address or addresses of the N4 interface UPF-C instances not exposing a 3GPP interface, such as a UPF-C-1 in the example in FIG. 12 are not registered.

While embodiments of the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A communication system for transmitting data packets, the system comprising:
at least one Access Node (AN) connectable to a user equipment (UE);
a User Plane Function (UPF) component; and
a data network (DN);
wherein the UPF component is a distributed component and comprises:
at least one User Plane Function Edge (UPF-E) component and a User Plane Function Core (UPF-C) component, the at least one UPF-E component being connected between the at least one AN and the UPF-C component, and the UPF-C component being connected between the at least one UPF-E component and the data network (DN) or another UPF-C; and a UPF Management (UPF-M) component configured to expose an N4 interface towards a Session Management Function (SMF), and to control packet processing functionality in the at least one UPF-E component and/or at least one UPF-C component.

2. The communication system of claim 1, wherein the UPF-M is further configured to:

control which capabilities for packet processing are required at the at least one UPF-E component and the UPF-C component, wherein the packet processing comprises at least one Packet Detection Rule (PDR) and at least one packet processing rule;

receive packet processing information from the SMF via the N4 interface, wherein the packet processing information contains information indicating which type of packet processing is required by the at least one PDR;

decide, for each data packet, a route the data packet has to traverse, wherein deciding the route for each data packet comprises deciding which UPF-E and UPC-C components each data packet has to traverse; and signal a PDR to a first UPF-E or UPF-C component in the route.

3. The communication system of claim 2, wherein the UPF-M is configured to: based on one or more UPF components of the route lacking one or more required packet processing capabilities, distribute the one or more required packet processing capabilities to each of the one or more UPF components.

4. The communication system of claim 2, wherein the first UPF-E or UPF-C component of the route is configured to:

receive the packet processing information from the UPF-M;

execute the PDR on a data packet;

insert one or more Segment Routing Headers (SRHs) in the data packet, wherein the one or more SRHs indicate to a next node of the route what packet processing rules are to be executed on the data packet, and wherein the one or more SRHs contain a locator and a function, where the locator is for routing the packet to the node and the function identifies the action to be performed on the next node;

apply the corresponding packet processing rules for the first UPF-E or UPF-C component to packets matching the PDR; and forward the data packet to a next component of the route.

5. The communication system of claim 4, wherein the next component of the route is configured to:

receive the packet processing information from the UPF-M;

apply the corresponding packet processing rules for the next component according to information present in the locator and the function; and forward the data packet to a further next component of the route or to the DN, according to the information present in the one or more SRHs.

6. The communication system of claim 4, wherein each UPF-E is configured to:

receive a data packet from the at least one AN;

terminate a General Packet Radio Service (GPRS) Tunneling Protocol for the user plane (GTP-U) tunnel with the at least one AN;

map, according to the packet processing information as provided by the UPF-M, GTP-U tunnel information to the one or more SRHs; and forward the data packet to the UPF-C component.

7. The communication system of claim 4, wherein the UPF-C component is configured to:

receive a data packet from the DN;

map, according to the packet processing information as provided by the UPF-M, the data packet to a mapped IPv6 address of a General Packet Radio Service (GPRS) Tunneling Protocol for the user plane (GTP-U) tunnel; and forward the data packet to the at least one UPF-E component or to another UPF-C component.

8. The communication system of claim 1, wherein the communication system comprises a plurality of ANs and a plurality of UPF-E components;

wherein each UPF-E component is connected to at least one AN.

9. The communication system of claim 1, wherein the communication system further comprises:

another UPF-C component connected between the at least one UPF-E component and a transport network (TN), or between the at least one UPF-E component and the DN, or between two or more UPF-C components.

10. The communication system of claim 1, wherein each UPF-E component is configured to expose a same IP-Protocol Data Unit Session Anchor (IP-PSA) towards the at least one AN.

11. The communication system of claim 1, wherein:

the at least one UPF-E component is configured to register a Network Function Repository Function (NRF) Network Function Service (NFS) instance exposing one or more N3 interfaces, its location, or a combination thereof; and/or the UPF-C component is configured to register a NRF NFS instance exposing one or more N6 interfaces, its location, its supported Data Network Names (DNNs), or a combination thereof; and/or the UPF-M component is configured to register a NRF NFS instance exposing one or more N4 interfaces, its location, or a combination thereof.

12. The communication system of claim 1, wherein the UPF-C component and the at least one UPF-E component are co-located, wherein co-located components run on a same device or software package, as a next generation Node B-Central Unit (gNB-CU) or transport network (TN) component.

13. A communication system for transmitting data packets, the system comprising:

at least one Access Node (AN) connectable to a user equipment (UE);

a User Plane Function (UPF) component;

a data network (DN); and a transport network (TN);

wherein the UPF component is a distributed component and comprises:

at least one User Plane Function Edge (UPF-E) component and a User Plane Function Core (UPF-C) component, the at least one UPF-E component being connected between the at least one AN and the TN, and the UPF-C being connected between the TN and the DN or another UPF-C; and a UPF Management (UPF-M) component configured to expose an N4 interface towards a Session Management Function (SMF), and to control packet processing functionality in the at least one UPF-E component and/or at least one UPF-C component.

14. The communication system of claim 13, wherein the TN is a Segment Routing version 6 (SRv6) TN or a Multiprotocol Label Switching (MPLS) TN.

15. The communication system of claim 13, wherein the UPF-M is further configured to:

control which capabilities for packet processing are required at the at least one UPF-E component and the UPF-C component, wherein the packet processing comprises at least one Packet Detection Rule (PDR) and at least one packet processing rule;

receive packet processing information from the SMF via the N4 interface, wherein the packet processing information contains information indicating which type of packet processing is required by the at least one PDR;

decide, for each data packet, a route the data packet has to traverse, wherein deciding the route for each data packet comprises deciding which UPF-E and UPC-C components each data packet has to traverse; and signal a PDR to a first UPF-E or UPF-C component in the route.

16. The communication system of claim 15, wherein the UPF-M is configured to: based on one or more UPF components of the route lacking one or more required packet processing capabilities, distribute the one or more required packet processing capabilities to each of the one or more UPF components.

17. The communication system of claim 15, wherein the first UPF-E or UPF-C component of the route is configured to:

receive the packet processing information from the UPF-M;

execute the PDR on a data packet;

insert one or more Segment Routing Headers (SRHs) in the data packet, wherein the one or more SRHs indicate to a next node of the route what packet processing rules are to be executed on the data packet, and wherein the one or more SRHs contain a locator and a function, where the locator for routing the packet to the node and the function identifies the action to be performed on the next node;

apply the corresponding packet processing rules for the first UPF-E or UPF-C component to packets matching the PDR; and forward the data packet to a next component of the route.

18. The communication system of claim 17, wherein the next component of the route is configured to:

receive the packet processing information from the UPF-M;

apply the corresponding packet processing rules for the next component according to information present in the locator and the function; and forward the data packet to a further next component of the route or to the DN, according to the information present in the one or more SRHs.

19. The communication system of claim 17, wherein each UPF-E is configured to:

receive a data packet from the at least one AN;

terminate a General Packet Radio Service (GPRS) Tunneling Protocol for the user plane (GTP-U) tunnel with the at least one AN;

map, according to the packet processing information as provided by the UPF-M, GTP-U tunnel information to the one or more SRHs; and forward the data packet to the UPF-C component.

20. The communication system of claim 17, wherein the UPF-C component is configured to:

receive a data packet from the DN;

map, according to the packet processing information as provided by the UPF-M, the data packet to a mapped IPv6 address of a General Packet Radio Service (GPRS) Tunneling Protocol for the user plane (GTP-U) tunnel; and forward the data packet to the at least one UPF-E component or to another UPF-C component.

* * * * *